US011423017B2

(12) United States Patent
Bos et al.

(10) Patent No.: US 11,423,017 B2
(45) Date of Patent: Aug. 23, 2022

(54) LOOK-AHEAD STAGING FOR ACCELERATED DATA EXTRACTION

(71) Applicant: SAP SE, Walldorf (DE)

(72) Inventors: Daniel Bos, Beijing (CN); Nico Gaertner, Nußloch (DE); Tobias Karpstein, Eschelbronn (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/118,770

(22) Filed: Dec. 11, 2020

(65) Prior Publication Data

US 2022/0188294 A1 Jun. 16, 2022

(51) Int. Cl.
*G06F 16/23* (2019.01)
*G06F 16/22* (2019.01)
*G06F 16/2457* (2019.01)
*G06F 16/25* (2019.01)

(52) U.S. Cl.
CPC ...... *G06F 16/2379* (2019.01); *G06F 16/2282* (2019.01); *G06F 16/2358* (2019.01); *G06F 16/24573* (2019.01); *G06F 16/254* (2019.01)

(58) Field of Classification Search
CPC .......... G06F 16/2379; G06F 16/24573; G06F 16/2282; G06F 16/2358; G06F 16/254
See application file for complete search history.

(56) References Cited

U.S. PATENT DOCUMENTS

| | | | |
|---|---|---|---|
| 6,889,231 B1* | 5/2005 | Souder | G06F 16/27 |
| 2005/0021567 A1* | 1/2005 | Holenstein | G06F 16/273 |
| 2005/0235075 A1* | 10/2005 | Dijkhof | G06F 5/06 710/52 |
| 2006/0004882 A1* | 1/2006 | Itikarlapalli | G06F 11/006 |

(Continued)

FOREIGN PATENT DOCUMENTS

| | | |
|---|---|---|
| EP | 3217301 A1 | 9/2017 |
| WO | WO-2016/119546 A1 | 8/2016 |

OTHER PUBLICATIONS

Bos et al., U.S. Appl. No. 17/118,788, filed Dec. 11, 2020, entitled "Look-Ahead Staging for Time-Travel Reconstruction".

(Continued)

*Primary Examiner* — William B Partridge
*Assistant Examiner* — Lahcen Ennaji
(74) *Attorney, Agent, or Firm* — Sterne, Kessler, Goldstein & Fox P.L.L.C.

(57) ABSTRACT

Disclosed herein are system, method, and computer program product embodiments for utilizing look-ahead-staging (LAS) to accelerate data extraction from a source system to a target system. An embodiment operates receiving a data change for a data extraction from a producer job at the source system. The embodiment stores the data change in a staging area of a persistent storage together with a respective sequence identifier. The embodiment receives a request for a next package of data changes in the staging area from a consumer job at the target system. The embodiment generates the next package from the staging area. The embodiment transmits the next package to the consumer job. The embodiment receives a commit notification for the next package from the consumer job. The embodiment then removes the data changes in the next package from the staging area in response to receiving the commit notification.

17 Claims, 5 Drawing Sheets

(56) References Cited

U.S. PATENT DOCUMENTS

| | | |
|---|---|---|
| 2007/0124347 A1 | 5/2007 | Vivian et al. |
| 2015/0032710 A1* | 1/2015 | Latrous ............... G06F 16/2365 |
| | | 707/703 |
| 2015/0347551 A1 | 12/2015 | Shang et al. |
| 2016/0275089 A1* | 9/2016 | Soundararajan ........ G06F 16/18 |
| 2016/0291980 A1 | 10/2016 | Ge et al. |
| 2017/0177617 A1 | 6/2017 | Johnson et al. |
| 2017/0185493 A1 | 6/2017 | Graefe |
| 2019/0361913 A1 | 11/2019 | Yoon et al. |
| 2020/0310798 A1 | 10/2020 | Shevgoor et al. |
| 2020/0320059 A1 | 10/2020 | Kumar et al. |
| 2021/0034476 A1* | 2/2021 | Mathur ............... G06F 11/1474 |

OTHER PUBLICATIONS

Extended Search Report for European Patent Application No. 21195925.9, dated Feb. 18, 2022, 7 pages.

\* cited by examiner

FIG. 1

| Data Change 202 | Sequence Identifier 204 | Operation Type 206 | Package Identifier 208 |
|---|---|---|---|
| Data Change 1 | 101 | Insert | 1 |
| Data Change 2 | 102 | Delete | 1 |
| Data Change 3 | 103 | Update | 1 |
| Data Change 4 | 104 | Insert | 2 |
| Data Change 5 | 105 | Update | 2 |
| ... | ... | ... | ... |

Staging Area 200

Control Area 300

| Subscription Identifier 302 | Package Identifier 304 | Package Status 306 | Data Changes 308 |
|---|---|---|---|
| Subscription 0 | 1 | Committed | Data 1 |
| Subscription 0 | 2 | In progress | Data 2 |
| Subscription 0 | 3 | New | Data 3 |
| Subscription 0 | 4 | Rolled back | Data 4 |
| Subscription 0 | 5 | Rolled back | Data 5 |
| ... | ... | ... | ... |

310 — 312 — 314 — 316 — 318

Staging Area Full 320

Data Available 322

Maximum Package Size 324

Number of Active Producers 326

Number of Active Consumers 328

Next Package Identifier 330

LOOK-AHEAD STAGING FOR ACCELERATED DATA EXTRACTION

BACKGROUND

It is often needed to transfer data from a source system to a target system. For example, a producer job can extract data from the source system and send the extracted data to a consumer job at the target system. The producer job can perform delta extraction from the source system and send the extracted data changes to the consumer job at the target system. The source system can often create a package (also referred to as a transaction) to transfer data to the target system. A package can represent a set of data changes that are either applied in full in the target system or are not applied at all. In the case of delta extraction, packages must be applied in full in the target system in order of creation to ensure data consistency between the source system and target system.

To ensure that a package is applied in full in the target system or not applied at all, the producer job can wait to receive a notification that the consumer job successfully committed the package before processing a new package. While the producer job waits for the notification from the consumer job, the source system and target system can lock their respective persistent storages to ensure data consistency between the source system and the target system. If a problem occurs anywhere between the source system and the target system, the source system can roll back the uncommitted package and try reconstructing it in the target system.

But this handshake process between the producer job and the consumer job can introduce a long wait time that reduces data throughput between the producer job and the consumer job. Moreover, this handshake process can limit the number of producer jobs and consumer jobs that can be executed in parallel because each job may need to be assigned to a separate region of data or else wait for its assigned region of data to be unlocked by another job.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for utilizing look-ahead-staging (LAS) to accelerate data extraction from a source system to a target system while guaranteeing data consistency and reproducibility.

An embodiment operates by receiving a data change for a data extraction from a producer job at a source system. The embodiment stores the data change in a staging area of a persistent storage together with a respective sequence identifier, wherein the staging area corresponds to the data extraction. The embodiment receives a request for a next package of data changes in the staging area from a consumer job at a target system. The embodiment generates the next package of data changes from the staging area. The embodiment transmits the next package to the consumer job. The embodiment receives a commit notification for the next package from the consumer job in response to the transmitting. The embodiment then removes the data changes in the next package from the staging area in response to receiving the commit notification for the next package.

The embodiment can solve at least four technological problems when performing a data extraction from a source system to a target system. First, the embodiment can increase data throughput by breaking the dependency between a producer job at the source system and a consumer job at the target system. For example, the producer job can store a data change for the data extraction in a LAS and immediately commit the data change to a persistent storage of the source system. This can allow the producer job to continue with the data extraction without waiting for a consumer job at the target system to actually commit the data change. Because both the producer job and the consumer job are decoupled, they no longer need to synchronize with each other and can scale independently. As a result, there can be an increase in data throughput between the producer job and the consumer job.

Second, the embodiment can improve load balancing among multiple producer jobs and multiple consumer jobs. For example, the LAS can generate a separate staging area in its persistent storage for each data extraction performed by a producer job. This can allow the producer job to store data changes from its respective data extraction in its respective staging area without blocking another producer job. As a result, multiple producer jobs can be executed in parallel, thereby increasing data throughput. Moreover, the LAS can enable switching to a different producer job when the staging area for the current producer job is full. Similarly, the LAS can enable switching to a different consumer job when the staging area for the current consumer job is empty. This can further increase data throughput between the source system and the target system.

Third, the embodiment can increase data throughput between the source system and the target system by reducing the amount of time the persistent storage of the source system is locked. For example, a producer job can store data changes in its respective staging area and then immediately commit those data changes to the persistent storage of the source system without waiting for those data changes to be committed at the target system. Similarly, a consumer job can retrieve a package of data changes from the LAS without blocking a producer job from processing more data changes for the consumer job. Finally, a consumer job can retrieve a package of data changes from the LAS without blocking another consumer job from retrieving a package of data changes from the LAS.

Fourth, the embodiment can increase data throughput between the source system and the target system by reducing a size of the data extraction. For example, a producer job can reduce the size of the data extraction by applying filters and or projections to the data changes of the data extraction prior to storing the data changes in the LAS. This can increase data throughput by decreasing the amount of time that the persistent storage of the LAS is locked. Moreover, this can increase data throughput by reducing a size of the data transmission to the target system.

Figure 1:
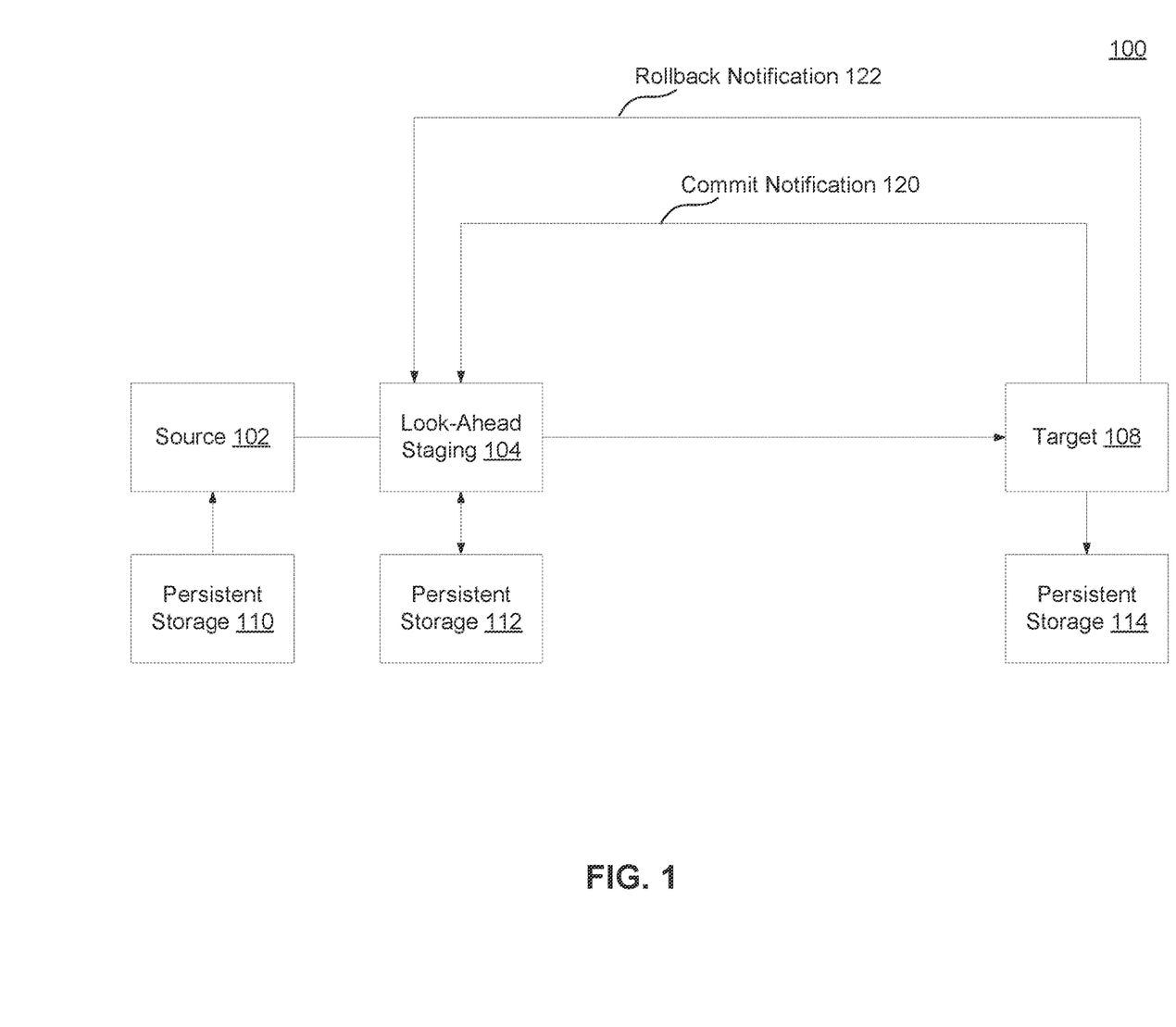
FIG. 1 is a block diagram of a system that utilizes look-ahead staging (LAS) to accelerate data extraction from a source system to a target system while guaranteeing data consistency and reproducibility, according to some embodiments.

FIG. 1 is a block diagram of a system 100 that utilizes LAS to accelerate data extraction from a source system to a target system while guaranteeing data consistency and reproducibility, according to some embodiments. System 100 can include source system 102, LAS 104, and target system 108. As would be appreciated by a person of ordinary skill in the art, system 100 can include multiple source systems 102 and multiple target systems 108.

Source system 102 can be a desktop computer, server, virtual machine, container, laptop, tablet, smartphone, or other device as would be appreciated by a person of ordinary skill in the art. Source system 102 can also be a software platform for cloud computing.

Source system 102 can be communicatively coupled to persistent storage 110. Persistent storage 110 can represent any storage device that retains data after power to the storage device is shut off. For example, persistent storage 110 can be a hard disk drive, solid-state drive, database, filesystem, object-store, or various other types of storage device as would be appreciated by a person of ordinary skill in the art.

LAS 104 can be a software module that is communicatively coupled to source system 102 and target system 108. LAS 104 can be a hardware module, device, or system that is communicatively coupled to source system 102 and target system 108.

LAS 104 can also be communicatively coupled to persistent storage 112. Persistent storage 112 can represent any storage device that retains data after power to the storage device is shut off. For example, persistent storage 112 can be a hard disk drive, solid-state drive, database, filesystem, object-store, or various other types of storage device as would be appreciated by a person of ordinary skill in the art.

Target system 108 can be a desktop computer, server, virtual machine, container, laptop, tablet, smartphone, or other device as would be appreciated by a person of ordinary skill in the art. Target system 108 can also be a software platform for cloud computing.

Target system 108 can be communicatively coupled to persistent storage 114. Persistent storage 114 can represent any storage device that retains data after power to the storage device is shut off. For example, persistent storage 114 can be a hard disk drive, solid-state drive, database, filesystem, object-store, or various other types of storage device as would be appreciated by a person of ordinary skill in the art.

Source system 102 can include one or more producer jobs. A producer job can be a software or hardware implemented process that collects data changes made to persistent storage 110 by source system 102. A producer job can provide the data changes affecting persistent storage 110 to one or more consumer jobs in target system 108. The producer job can provide data changes for a particular data extraction (e.g., data changes to a particular database table). A consumer job can be a software or hardware implemented process that receives the data changes from a producer job and attempts to commit the data changes to persistent storage 114 of target system 108.

To accelerate a data extraction, a producer job can provide data changes for the data extraction to LAS 104. LAS 104 can store the data changes to persistent storage 112. The producer job can then immediately commit the data changes to persistent storage 110.

After storing the data changes in persistent storage 112, LAS 104 can construct a package from the data changes. A package (also referred to as a transaction) can represent a set of data changes that are either applied in full in target system 108 (also referred to as committed) or are not applied at all. LAS 104 can transmit the package to a consumer job in target system 108. Thus, LAS 104 can break the dependency between source system 102 and target system 108. Because LAS 104 decouples a producer job from a consumer job, the producer job and the consumer job may no longer need to synchronize and can scale independently, thereby potentially allowing maximum data throughput between source system 102 and target system 108 during data extraction.

To accelerate data extraction, LAS 104 can generate a separate staging area in persistent storage 112 for each data extraction. A staging area can be a log of data changes made to persistent storage 110 for a given data extraction. A producer job can append a data change for a data extraction to its corresponding staging area. LAS 104 can generate a package from the data changes in the staging area. LAS 104 can then transmit the package to a consumer job at target system 108 to apply the data changes to persistent storage 114.

Figure 2:
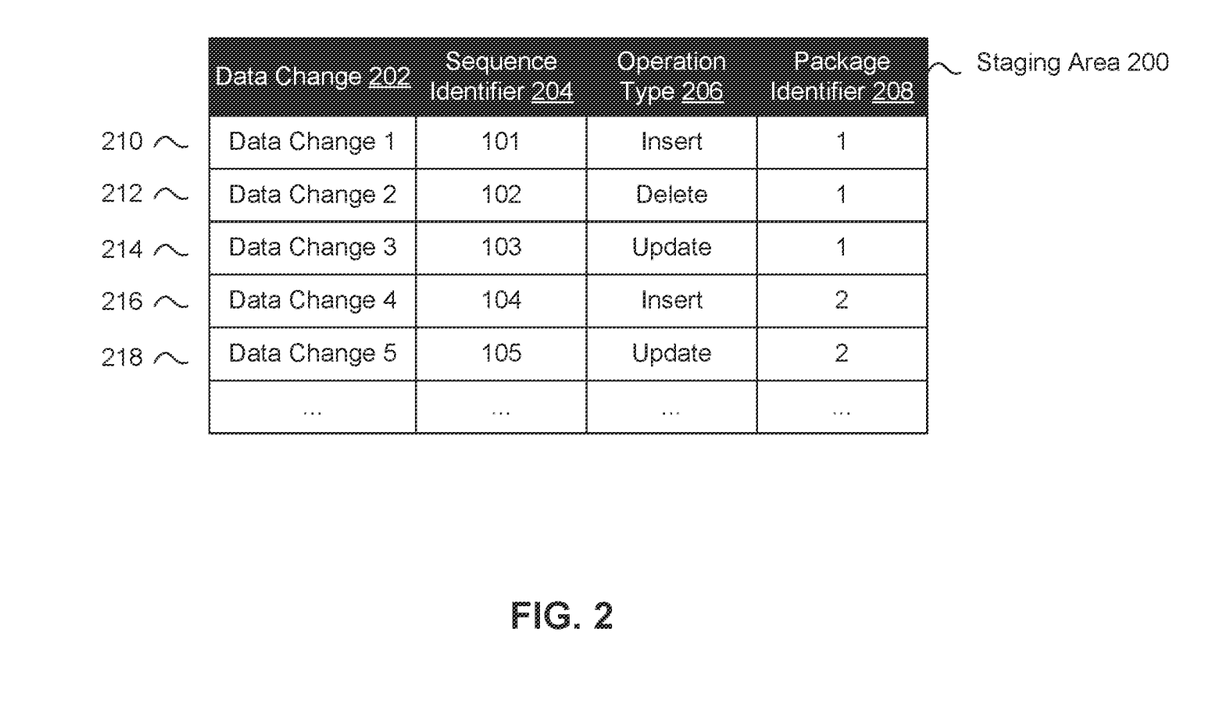
FIG. 2 is an example of a staging area for a data extraction from a producer job at a source system, according to some embodiments.

FIG. 2 is an example staging area 200 for a data extraction from a producer job at source system 102, according to some embodiments. FIG. 2 is described with reference to FIG. 1.

LAS 104 can generate staging area 200 for a data extraction from a producer job at source system 102. For example, LAS 104 can generate staging area 200 from a schema for a database object (e.g., a database table). LAS 104 can generate staging area 200 by extending the schema for the database object with additional fields. For example, staging area 200 can include data change entries 210, 212, 214, 216, and 218. A data change entry can include an underlying data change 202 to the database object, a sequence identifier 204, an operation type 206, and a package identifier 208.

LAS 104 can set the size of staging area 200. LAS 104 can calculate the size of staging area 200 based on throughput. For example, LAS 104 can calculate the size of staging area 200 based on a maximum package size, a number of active producers, and a number of active consumer jobs. The maximum package size, the number of active producers, and the number of active consumer jobs can be stored in control area 300 as maximum package size 324, number of active producers 326, and number of active consumers 328, respectively, as described in FIG. 3. LAS 104 can calculate the size of staging area 200 based on various other parameters as would be appreciated by a person of ordinary skill in the art.

A producer job can append a data change read from persistent storage 110 to staging area 200 via LAS 104. LAS 104 can receive the data change at an input adapter (also referred to as LAS IN adapter). The input adapter can be an application programming interface (API) to LAS 104. The producer job can utilize the input adapter to append the data change to staging area 200, and therefore to store the data change in persistent storage 112.

In some embodiments, a "push" producer job on source system 102 can transmit the data change to LAS 104 in a synchronous call. For example, the "push" producer job can call the input adapter of LAS 104 to transmit the data change to LAS 104, and therefore store the data change to persistent storage 112. The "push" producer job can wait until the call succeeds or fails (e.g., receives a response from LAS 104). If the call succeeds (e.g., LAS 104 stored the data change to persistent storage 112), the "push" producer job can commit the data change that was read from persistent storage 110. In response to the committing, source system 102 can release any associated locks on persistent storage 110, thereby reducing the duration of locking of persistent storage 110. If the call fails (e.g., LAS 104 failed to store the data change to persistent storage 112), the "push" producer job can retry calling LAS 104 to store the data change to persistent storage 112. In the case of a "push," writing into LAS 104 can happen from inside the producer job. As would be appreciated by a person of ordinary skill in the art, a "push" producer job can be software that runs in its own execution environment (e.g., outside LAS 104).

In some other embodiments, a "pull" producer job on source system 102 can be invoked from an external execution environment (e.g., in the same environment as LAS 104). For example, the input adapter of LAS 104 can poll the "pull" producer job on source system 102 for new data. In response, the "pull" producer software can transmit a data change representing the new data to LAS 104, and therefore store the data change to persistent storage 112. If the call succeeds (e.g., LAS 104 stored the data change to persistent storage 112), the "pull" producer job can commit the data change that was read from persistent storage 110. In response to the committing, source system 102 can release any associated locks on persistent storage 110, thereby reducing the duration of locking of persistent storage 110. If the call fails (e.g., LAS 104 failed to store the data change to persistent storage 112), the "pull" producer job can be re-invoked by the input adapter of LAS 104. In the case of a "pull," writing into LAS 104 can happen from a process inside LAS 104. As would be appreciated by a person of ordinary skill in the art, a "pull" producer job can be software in which its invocation occurs in an external execution environment.

In response to receiving the data change from the producer job, LAS 104 can generate a sequence identifier 204 indicating the order of the data change among the data changes for the data extraction. The consumer job can use the sequence identifier 204 to apply the data change to persistent storage 114 in the correct order.

LAS 104 can generate the sequence identifier 204 using a monotonically increasing number. LAS 104 can also generate the sequence identifier 204 using a timestamp of the data change. LAS 104 can also generate the sequence identifier 204 using various other techniques as would be appreciated by a person of ordinary skill in the art.

LAS 104 can generate an operation type 206 to indicate the type of change performed by the data change. For example, operation type 206 can indicate that the type of change is an insertion, update, or deletion. LAS 104 can generate the operation type 206 by analyzing the data change.

LAS 104 can assign a package identifier 208 to the data change. The package identifier 208 can indicate that the data change belongs to a particular package. LAS 104 can initially assign a package identifier 208 that indicates the data change is not yet assigned to any package. For example, LAS 104 can assign a package identifier 208 of 0 to the data change to indicate the data change is not assigned to any package. As would be appreciated by a person of ordinary skill in the art, LAS 104 can use a different value for package identifier 208 to indicate the data change is not assigned to any package.

LAS 104 can store the data change together with its respective sequence identifier 204, operation type 206, and package identifier 208 as a data change entry (e.g., data change entry 210) in staging area 200. LAS 104 can store data changes for the data extraction in order of receipt from the producer job.

Upon receipt of a data change at LAS 104, LAS 104 can store the data change in staging area 200 of persistent storage 112. If LAS 104 successfully stores the data change to persistent storage 112, source system 102 can treat the data change as committed without risk of data loss. In other words, once LAS 104 stores the data change to persistent storage 112, source system 102 can unlock the associated region of persistent storage 110 and read the next data change for transmission to LAS 104. This can allow LAS 104 to begin processing another data change before a consumer job completely process the original data change. Thus, LAS 104 can asynchronously process data changes in order through one or more consumer jobs.

To accelerate data extraction, source system 102 can reduce a size of the data changes stored in staging area 200, as well as a number of operations that may need to be performed by a consumer job. Source system 102 can reduce a number of rows that are pushed into a producer job, and if feasible into persistent storage 110, by applying one or more filters. A filter can remove the loading of one or more unnecessary rows. For example, if source data in persistent storage 110 has a field for "year," and a query only applies to the current year, the producer job can skip loading the other years. Source system 102 can apply one or more filters where a producer job does not support filtering itself.

In some embodiments, a producer job can "push down" a filter by applying it in the producer job. In some other embodiments, the producer job can "push down" a filter into a source database on persistent storage 110 by incorporating it into a database query.

Source system 102 can also reduce number of columns that are pushed into a producer job, and if feasible into persistent storage 110, by applying one or more projections. A projection can remove the loading of one or more unnecessary columns (also referred to as a fields).

In some embodiments, a producer job can "push down" a projection by applying it in the producer job. In some other embodiments, the producer job can "push down" a projection into a source database on persistent storage 110 by incorporating it into a database query.

To accelerate data extraction, LAS 104 can generate one or more packages from the staging area 200 for transmission to one or more consumer jobs at target system 108. A package (also referred to as a transaction) can represent a set of data changes that are either applied in full in target system 108 (also referred to as committed) or are not applied at all. LAS 104 can transmit the package to a consumer job in target system 108. Thus, LAS 104 can break the dependency between source system 102 and target system 108. Because LAS 104 decouples a producer job and a consumer job, the producer job and the consumer job may no longer need to synchronize and can scale independently, thereby potentially allowing maximum throughput during data extraction between source system 102 and target system 108.

To reduce the amount of time persistent storage 112 is locked, LAS 104 can perform a mark and sweep process to generate a package for transmission to a consumer job on target system 108. The mark and sweep process can involve LAS 104 marking data change entries in a staging area with a next package identifier. LAS 104 can then identify data change entries in the staging area assigned the next package identifier. LAS 104 can then generate a package for the next package identifier that includes the identified data change entries.

LAS 104 can perform the mark and sweep process using staging area 200 and a control area. The control area can track the data changes in staging area 200, reduce pressure on staging area 200, and coordinate the generation and transmission of one or more packages between a producer job on source system 102 and a consumer job on target system 108.

Figure 3:
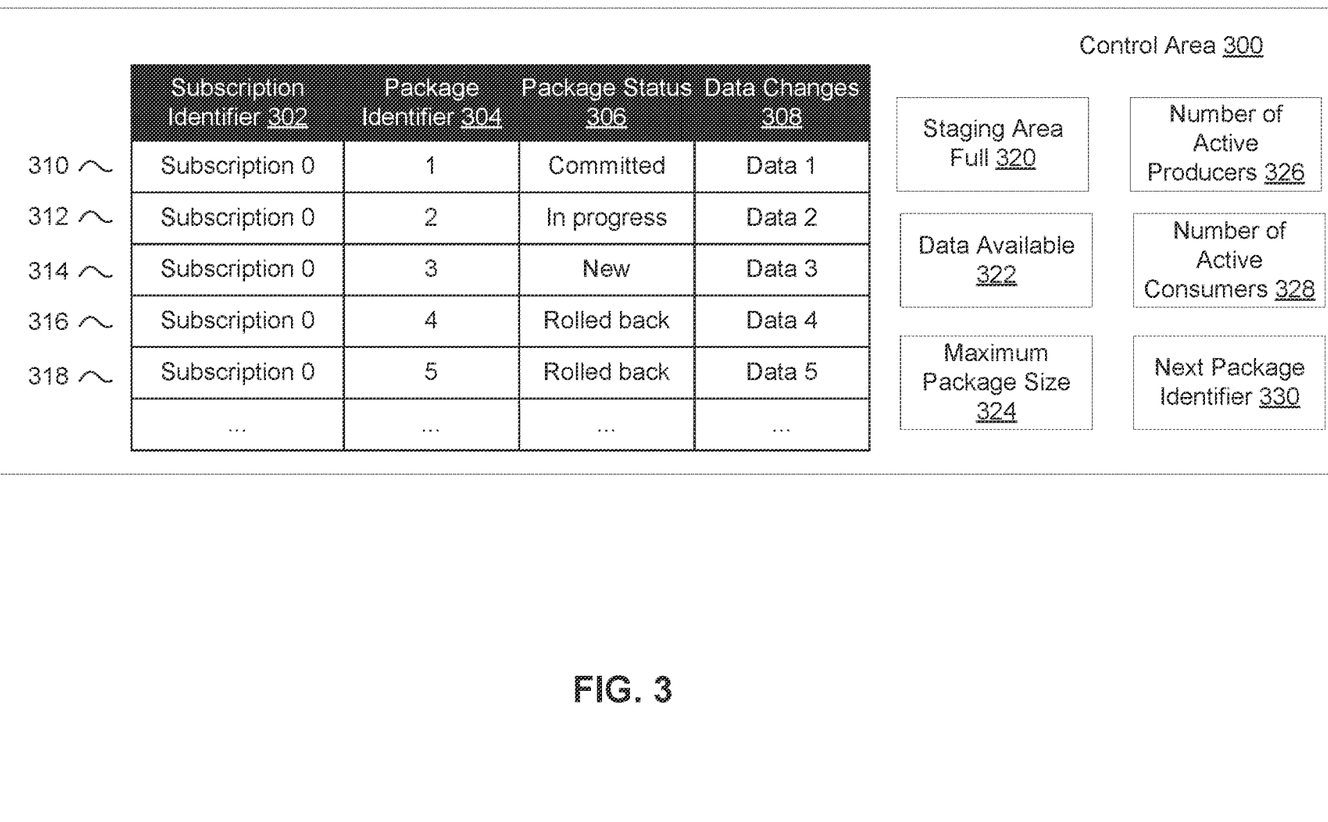
FIG. 3 is an example control area for accelerating a data extraction, according to some embodiments.

FIG. 3 is an example control area 300 for accelerating a data extraction, according to some embodiments. FIG. 3 is described with reference to FIGS. 1 and 2.

Control area 300 can include various control flags. Control area 300 can include staging area is full 320, data available 322, maximum package size 324, number of active producers 326, number of active consumers 328, and next package identifier 330. Staging area is full 320 can indicate whether staging area 200 is currently full. A producer job can check staging area is full 320 to determine if it can append a data change to staging area 200. A producer job can often determine if the staging area 200 is full much faster and computationally cheaper using staging area is full 300. This is because checking a flag (e.g., staging area is full 300) is often much faster and computationally cheaper than calculating whether staging area 200 is full each time.

Data available 322 can indicate whether one or more data changes are available in staging area 200 for package transmission to a consumer job at target system 108. A consumer job can check data available 322 to determine if it can retrieve a package of data changes from LAS 104.

Maximum package size 324 can indicate a maximum package size for a package. Maximum package size 324 can specify a maximum package size as a maximum number of data changes or a maximum data size. Maximum package size 324 can specify a maximum package size in various other ways as would be appreciated by a person of ordinary skill in the art.

Number of active producers 326 can indicate the number of active producer jobs interacting with LAS 104. LAS 104 can use number of active producer 326 to perform load balancing.

Number of active consumers 328 can indicate the number of active consumer jobs interacting with LAS 104. LAS 104 can use number of active consumers 328 to perform load balancing.

Control area 300 can include package entries 310, 312, 314, 316, and 318. Each package entry can represent a package that was processed by a consumer job, is being processed by a consumer job, or will be processed by a consumer job. Each package can include a subscription identifier 302, a package identifier 304, a package status 306, and data changes 308. As would be appreciated by a person of ordinary skill in the art, each package can include various other types of fields.

Subscription identifier 302 can uniquely identify a subscription of packages. A subscription of packages can represent a group of logically related packages. For example, a subscription of packages can represent a set of packages associated with a particular user.

Package identifier 304 can identify a set of data changes in staging area 200 that are either applied in full in target system 108 or are not applied at all. Package identifier 304 can also uniquely identify a logical position of a package within a subscription that is to be processed by a consumer job and committed to target system 108.

Package status 306 can represent a processing status of a package. A status of "committed" can indicate the corresponding package was committed by target system 108 to persistent storage 114. A status of "in-progress" can indicate the corresponding package is currently being processed by a consumer job and has not yet been committed by target system 108 to persistent storage 114. A status of "rolled back" can indicate the corresponding package failed to be committed by target system 108 to persistent storage 114 and therefore needs to be reconstructed. A status of "new" can indicate the corresponding package has not yet been processed by a consumer job. As would be appreciated by a person of ordinary skill in the art, a package can have various other statuses.

Data changes 308 can represent the actual set of data changes making up a package. For example, data changes 308 can include a set of data changes in staging area 200 having been marked with the corresponding package identifier 304. Data changes 308 can represent a series of structured query language (SQL) statements. Data changes 308 can also contain the actual contents of the package. Data changes 308 can also contain references to the content of the package. As would be appreciated by a person of ordinary skill in the art, data changes 308 can contain various other types of data.

To accelerate a data extraction, a consumer job can determine if data changes are available in staging area 200 using control area 300. The consumer job can determine if data changes are available using control area 300 via an output adapter of LAS 104 (also referred to as LAS OUT). The output adapter of LAS 104 can be an API.

The consumer job can determine if data changes are available by checking that data available 322 is set. Data available 322 can be a flag that indicates that data changes are available in staging area 200 for package transmission to the consumer job. As would be appreciated by a person of ordinary skill in the art, consumer job can determine if data changes are available using various other techniques.

In some embodiments, if data changes are unavailable for the current consumer job, LAS 104 can allow another consumer job to proceed with requesting a next package of data changes. The other consumer job can determine if data changes are available for it and then request a package of those data changes.

In some other embodiments, if data changes are unavailable for the current consumer job, LAS 104 can determine a work list of consumer jobs having data available for them. LAS 104 can allow each of the consumer jobs in this list to proceed with requesting a respective next package of data changes.

For example, in the case of multiple concurrent extractions to target system 108 that are generating data at a slow rate (e.g., during delta extraction where a table is not changed very often), LAS 104 can periodically get a work list of extractions. LAS 104 can then determine which extraction to execute from the work list. This can avoid the case of having one or more extractions run idle most of the time.

If data changes are available for the current consumer job, the consumer job can request a next package from LAS 104. The consumer job can request the next package via LAS OUT. In response, LAS 104 can retrieve the first package that was "rolled back" after a failure to commit the respective package at target system 108 to persistent storage 114. If there is no "rolled back" package, LAS 104 can generate a new package.

To generate a new package, LAS 104 can claim the next package identifier by atomically incrementing the next package identifier 330 in control area 300. Next package identifier 330 can indicate the next package identifier for a newly generated package.

LAS 104 can then perform a marking process. LAS 104 can atomically mark data change entries in staging area 200 with the next package identifier. LAS 104 can mark one or more data change entries in staging area 200 such that their respective package identifiers 208 are set to the next package identifier. LAS 104 can mark one or more data changes entries in staging area 200 up to maximum package size 324. Maximum package size 324 can specify a maximum package size as a maximum number of data changes or a maximum data size. Maximum package size 324 can specify a maximum package size in various other ways as would be appreciated by a person of ordinary skill in the art.

LAS 104 can block other consumer jobs from modifying staging area 200 during the marking process. This can prevent the other consumer jobs from marking the same data change entries. LAS 104 can perform the marking process using a single database operator.

After marking the data change entries in staging area 200, LAS 104 can perform a sweep operation. LAS 104 can identify data change entries in staging area 200 assigned the next package identifier. LAS 104 can then generate a package for the next package identifier that includes the identified data change entries.

For example, in FIG. 3, package entry 310 can represent a package including data change entries 210, 212, and 214 from staging area 200. Similarly, package entry 312 can represent a package including data change entries 216 and 218 from staging area 200.

LAS 104 can perform the sweeping process without blocking other consumer jobs. This is possible because the data change entries were already marked (e.g., claimed) in staging area 200, and thus this alerts the other consumer jobs so that they avoid remarking these data change entries.

In some embodiments, LAS 104 can condense the identified data changes as part of the sweeping process. For example, LAS 104 can condense data changes for the same keys. LAS 104 can condense data changes by combining multiple data changes for the same record with a single data change. This can increase data throughput between source system 102 and target system 108 because of the reduced size of the generated package.

After performing the sweep process, LAS 104 can store the generated package as a package entry in control area 300. LAS 104 can set the package status 306 of the generated package to "New." A status of "new" can indicate that a consumer job has not yet started processing the corresponding package.

After performing the sweep process, LAS 104 can provide the generated package to a consumer job. For example, LAS 104 can provide the data change entries making up the generated package together with the corresponding package identifier 304. As part of providing the generated package to the consumer job, LAS 104 can set the package status 306 for the generated package to "in progress." A status of "in-progress" can indicate the corresponding package is currently being processed by the consumer job but has not yet been committed by target system 108 to persistent storage 114.

In response to receiving a commit notification 120 for a package from target system 108, LAS 104 can mark the corresponding package's status 306 as "committed" in control area 300. LAS 104 can then delete the corresponding package from control area 300 of persistent storage 112. LAS 104 can also delete the corresponding data change entries in staging area 200 of persistent storage 112.

In some embodiments, where a package is attempted to be committed to multiple target systems 108, LAS 104 can mark the corresponding package's status 306 as "committed" in control area 300 in response to receiving a commit notification 120 for the package from each target system 108. LAS 104 can then delete the corresponding package from control area 300 of persistent storage 112 after receiving a commit notification 120 from each target system 108. LAS 104 can also delete the corresponding data change entries in staging area 200 of persistent storage 112.

In response to receiving a rollback notification 122 for a package from target system 108, LAS 104 can automatically drop all packages subsequent to the rolled back package in control area 300. This can prevent the creation of duplicate packages in persistent storage 114. This can further prevent inconsistencies due to order-dependency in the packages.

In response to receiving the rollback notification 122 for the package from target system 108, LAS 104 can also rollback and reconstruct all succeeding "in-progress" packages. In some embodiments, LAS 104 can identify the succeeding "in-progress" packages as those packages having a package status 306 of "in-progress" and a package identifier 304 having a time of receipt (e.g., a larger package identifier) that is later than the package being rolled back. In some other embodiments, LAS 104 can identify the succeeding "in-progress" packages as those packages having a package status 306 of "in-progress," a package identifier 304 having a time of receipt (e.g., a larger package identifier) that is later than the package being rolled back, and a subscription identifier 302 that is the same as the subscription identifier 302 of the package being rolled back.

LAS 104 can then generate new packages corresponding to all the succeeding "in-progress" packages. LAS 104 can change the package status 306 of each of the generated packages to "rolled back." LAS 104 can then sequentially transmit each of the generated packages to a consumer job. LAS 104 can change the package status 306 of each of the generated packages to "in-progress" after transmitting the respective generated package to the consumer job.

LAS 104 can generate these new packages using a variation of the mark and sweep process. LAS 104 can generate these new packages in response to a consumer job requesting a next package. LAS 104 can retrieve the first package that was "rolled back" after a failure to commit the respective package at target system 108 to persistent storage 114. In other words, LAS 104 can retrieve the package identifier 304 of the first "rolled back" package.

LAS 104 can skip the mark process for the first "rolled back" package because the data change entries in staging area 200 were previously marked with the corresponding package identifier 304. LAS 104 can then perform the sweep process. LAS 104 can identify the data change entries in staging area 200 that are assigned the package identifier 304 of the "rolled back" package. LAS 104 can then generate a package for the "rolled back" package that includes the identified data change entries.

In addition to the mark and sweep process, LAS 104 can facilitate load balancing by controlling how often a producer job appends data changes to staging area 200. In some embodiments, LAS 104 can append data changes for a data extraction from a producer job to staging area 200 until reaching a high-water mark of data in staging area 200. This can prevent the ordered list of data changes from growing unbounded and can provide the producer job a chance to do other work.

In some other embodiments, LAS 104 can append data changes for a data extraction from a producer job to staging area 200 until staging area 200 contains a threshold number of data changes. For example, LAS 104 can append data changes to staging area 200 while the staging area 200 contains less than a threshold number of data changes.

In some other embodiments, LAS 104 can append data changes for a data extraction from a producer job to staging area 200 until staging area 200 contains a threshold level of data. In some other embodiments, LAS 104 can append data changes for a data extraction from a producer job to staging area 200 until reaching various other threshold values.

In some embodiments, LAS 104 can append data changes for a data extraction from a producer job to staging area 200 until reaching a global high-water mark of data. The global high-water mark of data can be a threshold level of data that is independent of whether the next received data change is part of the same logical set of packages (e.g., shares the same subscription identifier 302).

In some other embodiments, LAS 104 can append data changes for a data extraction from a producer job to staging area 200 until reaching a subscription high-water mark of data. The subscription high-water mark of data can be a threshold level of data that is subscription identifier 302 specific.

In some embodiments, a producer job can determine whether it can append a data change to staging area 200 by checking staging area is full 220. Staging area is full 220 can be a flag that represents whether staging area 200 is full. LAS 104 can ensure that staging area is full 220 reflects whether staging area 200 is full. This can enable the producer job to avoid having to calculate whether staging area 200 is full.

Figure 4:
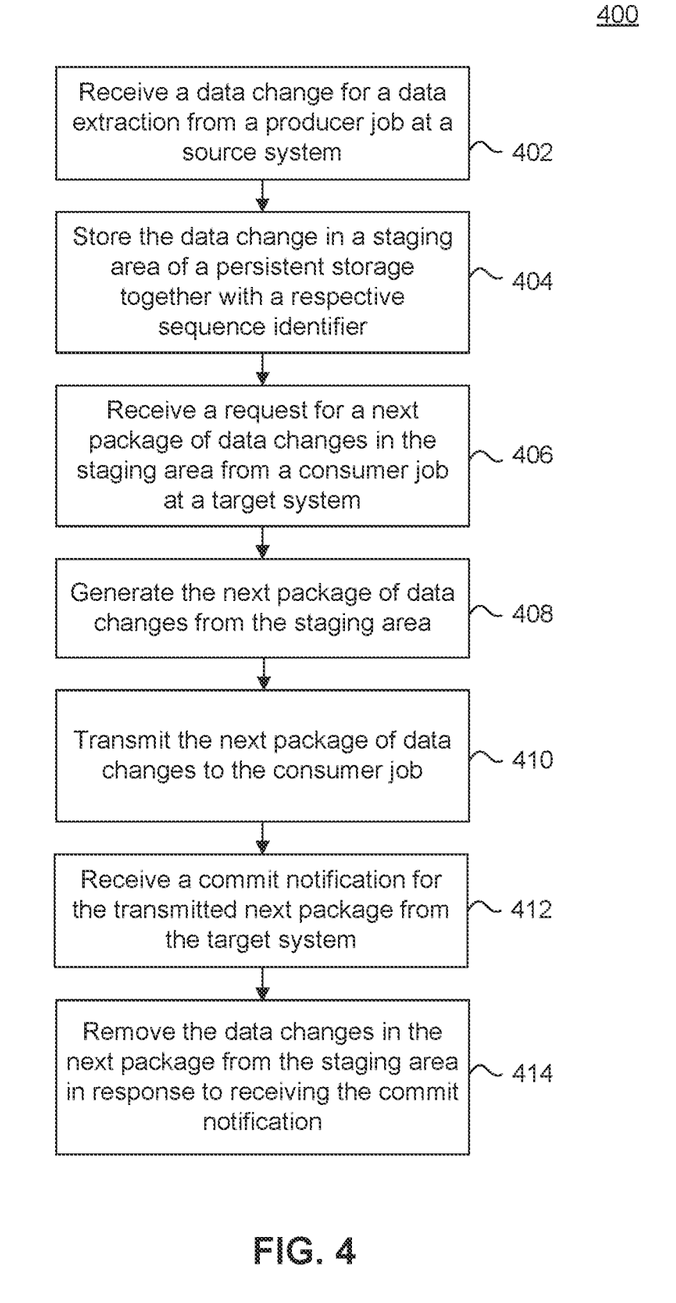
FIG. 4 is a flowchart illustrating a process for utilizing a LAS to accelerate data extraction from a source system to a target system while guaranteeing consistency and reproducibility, according to some embodiments.

FIG. 4 is a flowchart for a method 400 for utilizing a LAS to accelerate data extraction from a source system to a target system while guaranteeing consistency and reproducibility, according to an embodiment. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIGS. 1, 2, and 3. However, method 400 is not limited to that example embodiment.

In 402, LAS 104 receives a data change for a data extraction from a producer job at source system 102 for appending to staging area 200.

In some embodiments, LAS 104 can generate staging area 200 for the data extraction. LAS 104 can generate staging area 200 based on a schema of a database object (e.g., a database table) associated with the data extraction. LAS 104 can also generate staging area 200 based on a schema of a database object (e.g., a database table) associated with the data extraction and maximum package size 324. LAS 104 can also generate staging area 200 based on a schema of a database object (e.g., a database table) associated with the data extraction, maximum package size 324, and number of active consumers 328. LAS 104 can also generate staging area 200 based on a schema of a database object (e.g., a database table) associated with the data extraction, maximum package size 324, number of active producers 326, and number of active consumers 328.

In some embodiments, LAS 104 can determine whether staging area 200 is partially empty. LAS 104 can receive the data change for the data extraction from the producer job in response to determining that staging area 200 is partially empty.

In 404 LAS 104 stores the data change in staging area 200 of persistent storage 112 together with a respective sequence identifier 204.

In some embodiments, LAS 104 can generate the respective sequence identifier 204 in response to receiving the data change. The respective sequence identifier 204 can identify an order of the data change in the data extraction.

LAS 104 can generate the sequence identifier 204 using a monotonically increasing number. LAS 104 can also generate the sequence identifier 204 using a timestamp of the data change. LAS 104 can also generate the sequence identifier 204 using various other techniques as would be appreciated by a person of ordinary skill in the art.

In 406, LAS 104 receives a request for a next package of data changes in staging area 200 from a consumer job at target system 108. LAS 104 can receive the request via an output adapter of LAS 104 (also referred to as LAS OUT). The output adapter of LAS 104 can be an API.

In some embodiments, LAS 104 can determine whether staging area 200 contains data changes for a next package. LAS can determine whether staging area 20 contains data changes for a next package by checking whether data available 322 is set. LAS 104 can receive the request for a next package of data changes from the consumer job in response to determining that staging area 200 contains data changes for a next package.

In some embodiments, if data changes are unavailable for the consumer job, LAS 104 can allow another consumer job to proceed with requesting a next package of data changes. The other consumer job can determine if data changes are available for it and then request a package of those data changes. In some other embodiments, if data changes are unavailable for the consumer job, LAS 104 can determine a work list of consumer jobs having data available for them. LAS 104 can allow each of the consumer jobs in this list to proceed with requesting a respective next package of data changes.

In 408, LAS 104 generates the next package of data changes from staging area 200.

In some embodiments, if there is no "rolled back" package in control area 300, LAS 104 can generate a new package. To generate the new package, LAS 104 can claim the next package identifier by atomically incrementing the next package identifier 330 in control area 300. LAS 104 can then atomically mark data change entries in staging area 200 with the next package identifier. LAS 104 can mark one or more data change entries in staging area 200 such that their respective package identifiers 208 are set to the next package identifier.

After marking the data change entries in staging area 200, LAS 104 can identify data change entries in staging area 200 assigned the next package identifier. LAS 104 can then generate a new package for the next package identifier that includes the identified data change entries. LAS 104 can store the generated package as a package entry in control area 300. LAS 104 can set the package status 306 of the generated package to "New."

In some other embodiments, if there a "rolled back" package in control area 300, LAS 104 can retrieve the first package that was "rolled back" after a failure to commit the respective package at target system 108 to persistent storage 114. In other words, LAS 104 can retrieve the package identifier 304 of the first "rolled back" package.

LAS 104 can skip the mark process for the first "rolled back" package because the data change entries in staging area 200 were previously marked with the corresponding package identifier 304. LAS 104 can then perform the sweep process. LAS 104 can identify the data change entries in staging area 200 that are assigned the package identifier 304 of the "rolled back" package. LAS 104 can then generate a package for the "rolled back" package that includes the identified data change entries.

In some embodiments, LAS 104 can set data available 322 in control area 300 after generating the next package.

In 410, LAS 104 transmits the next package of data changes to the consumer job. LAS 104 can set the corresponding package status 306 of the next package to "in progress" after transmitting the next package to the consumer job.

In 412, LAS 104 receives a commit notification 120 for the transmitted next package from target system 108. LAS 104 can receive the commit notification 120 via an output adapter of LAS 104 (also referred to as LAS OUT). The output adapter of LAS 104 can be an API. LAS 104 can mark the transmitted package as "committed" in control area 300 in response to receiving the commit notification 120.

In 414, LAS 104 removes the data changes in the next package from staging area 200 in response to receiving the commit notification 120. LAS 104 can also delete the corresponding package from control area 300.

Figure 5:
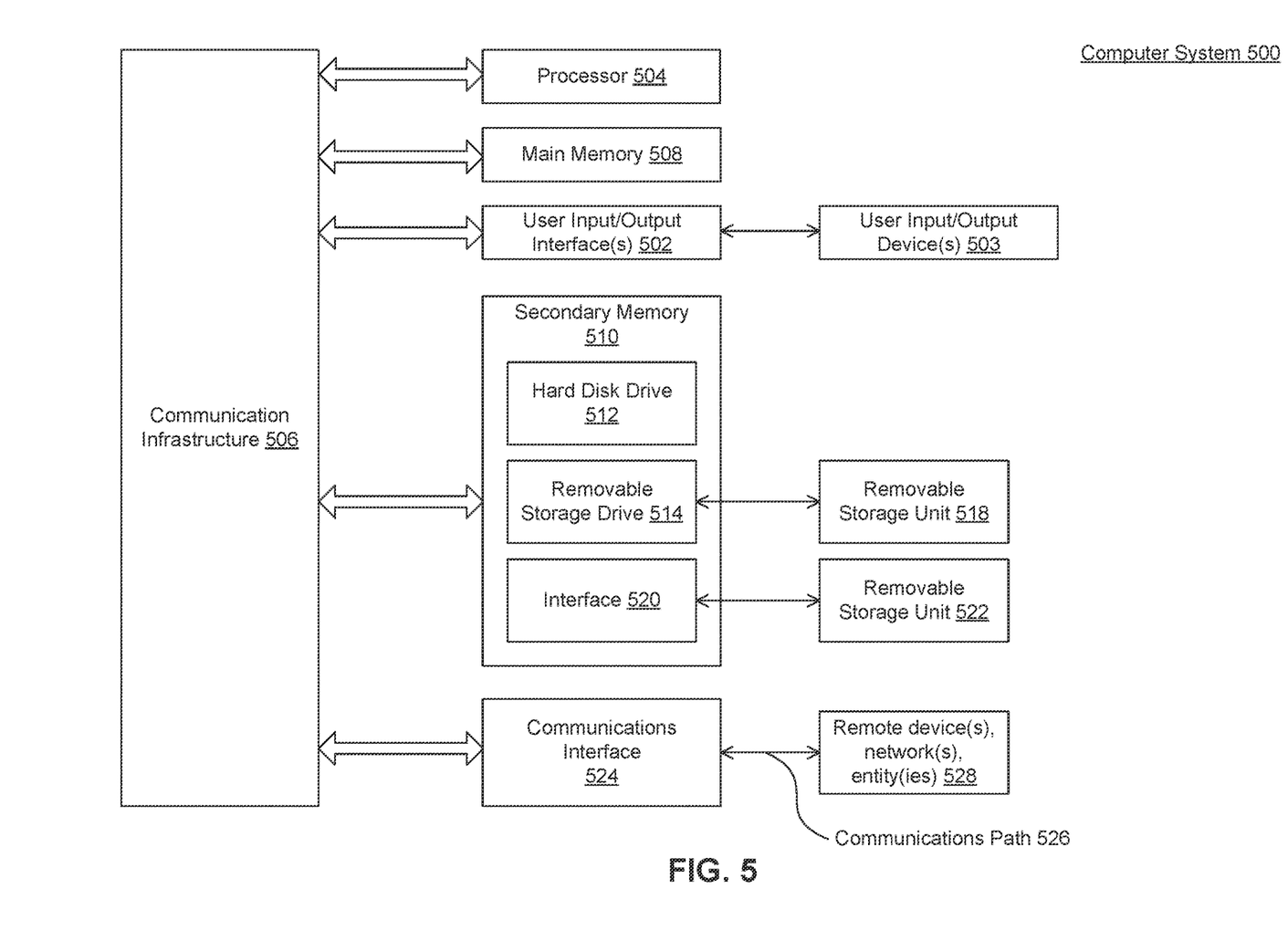
FIG. 5 is an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof. Computer system 500 can be used, for example, to implement method 400 of FIG. 4.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for accelerating a data extraction from a source system to a target system, comprising:
   receiving, by at least one processor, a data change for the data extraction from a producer job at the source system;
   storing, by the at least one processor, the data change in a staging area of a persistent storage together with a respective sequence identifier, wherein the staging area corresponds to the data extraction;
   receiving, by the at least one processor, a request for a next package of data changes in the staging area from a consumer job at the target system;
   generating, by the at least one processor, a next package identifier based on a next package identifier in a control area of the persistent storage, wherein the generating the next package identifier is performed atomically;
   marking, by the at least one processor, a set of data changes in the staging area with the next package identifier based on a maximum package size in the control area, wherein the marking the set of data changes is performed atomically;
   generating, by the at least one processor, the next package based on the set of data changes marked with the next package identifier;
   transmitting, by the at least one processor, the next package to the consumer job;
   receiving, by the at least one processor, a commit notification for the next package from the consumer job in response to the transmitting; and
   removing, by the at least one processor, the data changes in the next package from the staging area in response to receiving the commit notification for the next package.

2. The method of claim 1, further comprising:
   determining, by the at least one processor, the staging area is partially empty; and
   wherein the receiving the data change further comprises receiving, by the at least one processor, the data change from the producer job in response to the determining the staging area is partially empty.

3. The method of claim 1, further comprising:
   generating, by the at least one processor, the respective sequence identifier in response to receiving the data change, wherein the respective sequence identifier identifies an order of the data change in the data extraction.

4. The method of claim 1, further comprising:
   setting, by the at least one processor, a package status for the next package in the control area to "in progress"; and
   setting, by the at least one processor, a data available flag in the control area, wherein the data available flag indicates data is available for the consumer job.

5. The method of claim 1, further comprising:
   retrieving, by the at least one processor, a second next package identifier corresponding to a package that has been rolled back; and
   generating, by the at least one processor, a second next package based on a set of data changes in the staging area marked with the second next package identifier corresponding to the package that has been rolled back.

6. The method of claim 1, further comprising:
generating, by the at least one processor, the staging area for the data extraction based on a schema of a database table and a maximum package size, wherein the staging area comprises a set of data changes, wherein each data change comprises a sequence identifier, a package identifier, and an operation type.

7. A system, comprising:
a memory; and
at least one processor coupled to the memory and configured to:
receive a data change for a data extraction from a producer job at a source system;
store the data change in a staging area of a persistent storage together with a respective sequence identifier, wherein the staging area corresponds to the data extraction;
receive a request for a next package of data changes in the staging area from a consumer job at a target system;
generate a next package identifier based on a next package identifier in a control area of the persistent storage, wherein the generating the next package identifier is performed atomically;
mark a set of data changes in the staging area with the next package identifier based on a maximum package size in the control area, wherein the marking the set of data changes is performed atomically;
generate the next package based on the set of data changes marked with the next package identifier;
transmit the next package to the consumer job;
receive a commit notification for the next package from the consumer job in response to the transmitting; and
remove the data changes in the next package from the staging area in response to receiving the commit notification for the next package.

8. The system of claim 7, wherein the at least one processor is further configured to:
determine the staging area is partially empty; and
wherein to receive the data change, the at least one processor is further configured to receive the data change from the producer job in response to the determining the staging area is partially empty.

9. The system of claim 7, wherein the at least one processor is further configured to:
generate the respective sequence identifier in response to receiving the data change, wherein the respective sequence identifier identifies an order of the data change in the data extraction.

10. The system of claim 7, wherein the at least one processor is further configured to:
set a package status for the next package in the control area to "in progress"; and
set a data available flag in the control area, wherein the data available flag indicates data is available for the consumer job.

11. The system of claim 7, wherein the at least one processor is further configured to:
retrieve a second next package identifier corresponding to a package that has been rolled back; and
generate a second next package based on a set of data change in the staging area marked with the second next package identifier corresponding to the package that has been rolled back.

12. The system of claim 7, wherein the at least one processor is further configured to:
generate the staging area for the data extraction based on a schema of a database table and a maximum package size, wherein the staging area comprises a set of data changes, wherein each data change comprises a sequence identifier, a package identifier, and an operation type.

13. A non-transitory computer-readable medium having instructions stored thereon that, when executed by at least one computing device, cause the at least one computing device to perform operations comprising:
receiving a data change for a data extraction from a producer job at a source system;
storing the data change in a staging area of a persistent storage together with a respective sequence identifier, wherein the staging area corresponds to the data extraction;
receiving a request for a next package of data changes in the staging area from a consumer job at a target system;
generating a next package identifier based on a next package identifier in a control area of the persistent storage, wherein the generating the next package identifier is performed atomically;
marking a set of data changes in the staging area with the next package identifier based on a maximum package size in the control area, wherein the marking the set of data changes is performed atomically;
generating the next package based on the set of data changes marked with the next package identifier;
transmitting the next package to the consumer job;
receiving a commit notification for the next package from the consumer job in response to the transmitting; and
removing the data changes in the next package from the staging area in response to receiving the commit notification for the next package.

14. The non-transitory computer-readable medium of claim 13, wherein the operations further comprise:
determining the staging area is partially empty; and
wherein the receiving the data change further comprises receiving the data change from the producer job in response to the determining the staging area is partially empty.

15. The non-transitory computer-readable medium of claim 13, wherein the operations further comprise:
generating the respective sequence identifier in response to receiving the data change, wherein the respective sequence identifier identifies an order of the data change in the data extraction.

16. The non-transitory computer-readable medium of claim 13, wherein the operations further comprise:
setting a package status for the next package in the control area to "in progress"; and
setting a data available flag in the control area, wherein the data available flag indicates data is available for the consumer job.

17. The non-transitory computer-readable medium of claim 13, wherein the operations further comprise:
retrieving a second next package identifier corresponding to a package that has been rolled back; and
generating a second next package based on a set of data change in the staging area marked with the second next package identifier corresponding to the package that has been rolled back.

* * * * *